United States Patent
Cook et al.

(10) Patent No.: US 11,001,127 B2
(45) Date of Patent: May 11, 2021

(54) AUTOMOTIVE DOOR MODULE FOR WINDOW REGULATOR

(71) Applicant: Hi-Lex Controls, Inc., Rochester Hills, MI (US)

(72) Inventors: Beau Cook, Holly, MI (US); Stephen J. Brinck, Center Line, MI (US); Tuan Tony Nguyen, Sterling Heights, MI (US)

(73) Assignee: Hi-Lex Controls, Inc., Rochester Hills, MI (US)

( * ) Notice: Subject to any disclaimer, the term of this patent is extended or adjusted under 35 U.S.C. 154(b) by 229 days.

(21) Appl. No.: 16/199,914

(22) Filed: Nov. 26, 2018

(65) Prior Publication Data

US 2020/0164726 A1 May 28, 2020

(51) Int. Cl.
| | |
|---|---|
| *B60J 5/04* | (2006.01) |
| *E05D 15/16* | (2006.01) |
| *E05F 15/689* | (2015.01) |
| *B29C 45/16* | (2006.01) |
| *E05F 11/38* | (2006.01) |

(52) U.S. Cl.
CPC ......... *B60J 5/0416* (2013.01); *B29C 45/1671* (2013.01); *E05D 15/165* (2013.01); *E05F 11/382* (2013.01); *E05F 15/689* (2015.01); *B60J 5/0418* (2013.01); *E05Y 2201/612* (2013.01); *E05Y 2900/531* (2013.01); *E05Y 2900/55* (2013.01)

(58) Field of Classification Search
CPC ...... B60J 5/0416; E05F 11/382; E05F 11/488; E05F 11/483; E05F 11/486; E05F 15/689; E05Y 2900/531; E05Y 2900/55; E05Y 2201/612
See application file for complete search history.

(56) References Cited

U.S. PATENT DOCUMENTS

| | | | |
|---|---|---|---|
| 6,192,632 B1 * | 2/2001 | Medebach | B60J 5/0416 296/146.7 |
| 6,640,500 B1 * | 11/2003 | Stout | B60J 5/0416 296/146.7 |
| 7,246,465 B2 | 7/2007 | Staser | |
| 2006/0000149 A1 * | 1/2006 | Radu | B60J 5/0416 49/502 |

(Continued)

FOREIGN PATENT DOCUMENTS

| | | |
|---|---|---|
| DE | 202006005797 U1 | 8/2006 |
| EP | 2611635 B1 | 11/2015 |

*Primary Examiner* — Justin B Rephann
(74) *Attorney, Agent, or Firm* — Dickinson Wright PLLC

(57) ABSTRACT

A vehicle door assembly includes a door module and a door panel. The door module has a back plate with a periphery bearing attachment orifices defining a base plane. At least one guide rail extends in a rail direction in a rail plane offset from the base plane and has a connected edge and a free edge. The connected edge is attached to the back plate, and the free edge is shaped for slidably attaching a carrier plate for a window. The guide rail vertically protrudes beyond the periphery of the back platen. A void in the rail plane intersects a trajectory of the connected edge. The void provides access through the rail plane to the periphery of the back plate, wherein an attachment orifice is disposed in the void. The door panel has a central hole and attachment openings aligned with the attachment orifices of the door module.

13 Claims, 9 Drawing Sheets

(56) References Cited

U.S. PATENT DOCUMENTS

| | | | |
|---|---|---|---|
| 2006/0196122 A1* | 9/2006 | Urieta | B60J 5/0416 49/502 |
| 2007/0044382 A1* | 3/2007 | Moriyama | E05F 15/689 49/352 |
| 2008/0222962 A1* | 9/2008 | Staser | E05F 11/488 49/502 |
| 2010/0293864 A1* | 11/2010 | Staser | B60J 5/0416 49/506 |
| 2011/0023367 A1* | 2/2011 | Barr | B60J 5/0416 49/349 |
| 2012/0036780 A1* | 2/2012 | Pleiss | B60J 5/0416 49/70 |
| 2016/0039272 A1* | 2/2016 | Kroack | E05F 11/382 403/380 |
| 2016/0288630 A1 | 10/2016 | Oertel et al. | |
| 2018/0117998 A1 | 5/2018 | Fischer et al. | |
| 2018/0194205 A1* | 7/2018 | Nebreda De La Iglesia | B60J 5/0416 |
| 2018/0345765 A1* | 12/2018 | Magazzini | B60J 5/0416 |

* cited by examiner

AUTOMOTIVE DOOR MODULE FOR WINDOW REGULATOR

TECHNICAL FIELD

The present application relates to a door module for an automotive vehicle, which includes a back plate on which guide rails of a window regulator are provided.

BACKGROUND

Such a door module is configured for mounting on an inner door panel and includes through-holes for the insertion of attachment clips.

The guide rail or rails of some designs protrude beyond an upper edge of the back plate surface, in order to provide a longer travel path for the window pane to be adjusted. For such a solution, the back plate is mounted to the inner door panel by inserting the protruding end portion of the guide rail or rails from the vehicle-inner side (dry side) to the vehicle-outer side (wet side) into the mounting opening of the door panel and then by attaching the periphery of the back plate to the dry side of the door panel. A seal extends along the periphery of the back plate between the back plate and the door panel for ensuring a water-resistant separation of the wet side from the dry side of the door module.

The through-holes for the attachment clips distributed along the periphery of the back plate are generally limited to locations that are outside of the areas covered by the guide rails. In molded plastic door modules, this may result in a distance between the through-holes that is greater than desirable. A large space between the attachment clips makes it a challenge to establish a proper seal between the through-holes. Furthermore, the structural support provided by the door panel to the plastic back plate is limited to a few attachment points determined by the locations of the through-holes. As the back plate carries the window regulator that in turn carries a window pane, the back plate needs to withstand various forces resulting from the weight and movement of the window pane. It is thus desirable to provide a good support of the back plate by the door panel, which is typically made of sturdy sheet metal.

SUMMARY

According to a first aspect of the present invention, a vehicle door module has a back plate for carrying functional components of a window regulator. The back plate has a periphery with attachment orifices defining a base plane. At least one guide rail extends in a rail direction in a rail plane offset from the base plane and has a connected edge and a free edge. Both of the edges extend in the rail direction. The connected edge is attached to the back plate, and the free edge is shaped for slidably attaching a carrier plate for a window.

The guide rail has an upper end vertically protruding beyond the periphery of the back plate in an installed position. A void in the rail plane intersects a trajectory of the connected edge of at least one guide rail. The void provides access through the rail plane to the periphery of the back plate, wherein an attachment orifice is disposed in the void.

According to a further aspect of the present invention, a vehicle door assembly includes a door module as described above and a door panel. The door panel has a central hole with a periphery overlapping with the periphery of the back plate and has respective attachment openings aligned with the attachment orifices of the back plate of the door module.

According to yet another aspect of the present invention, a method of injection-molding a door module as described above comprises the step of inserting a die tool into a mold in locations where the voids are formed in a direction transverse to the base plane.

A vertical slide tool can be into the mold in a direction parallel to the base plane in a location between the base plane and the rail plane from a side proximate to the upper ends of the guide rails to form space between the base plane and the rail plane for the door panel.

Upon installation of the door module, the guide rails including their upper ends are on the vehicle-outer side of the door panel, the back plate is on the vehicle-inner side of the door panel, and the periphery of the back plate is secured to the door panel vial aligned attachment orifices and attachment openings.

Further details and benefits of the present invention become apparent from the following description of the attached drawings. The drawings are provided herewith for purely illustrated purposes and are not intended to limit the scope of the present invention.

DETAILED DESCRIPTION

The drawings provided herewith are not necessarily to scale, except where expressly stated.

Figure 9:
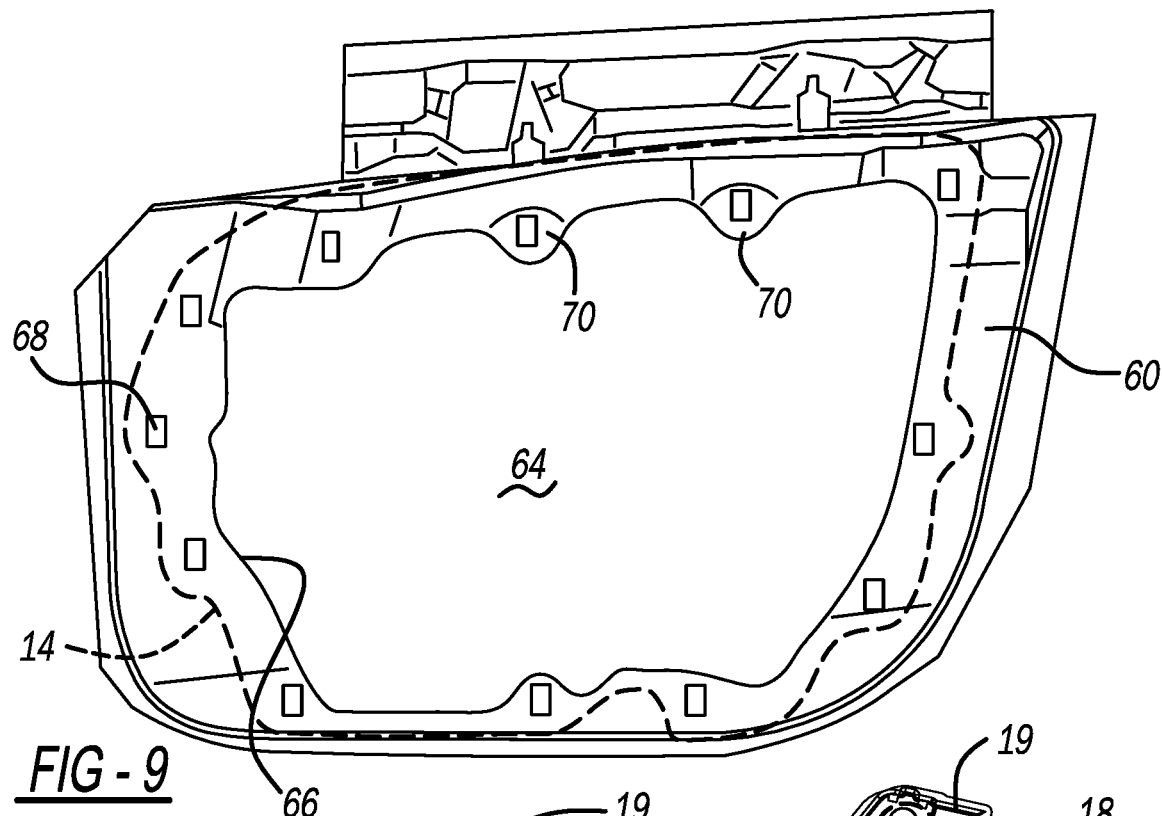
FIG. 9 shows a dry-side view of a door panel suited for mounting the door module of FIGS. 1 and 2.
Figure 10:
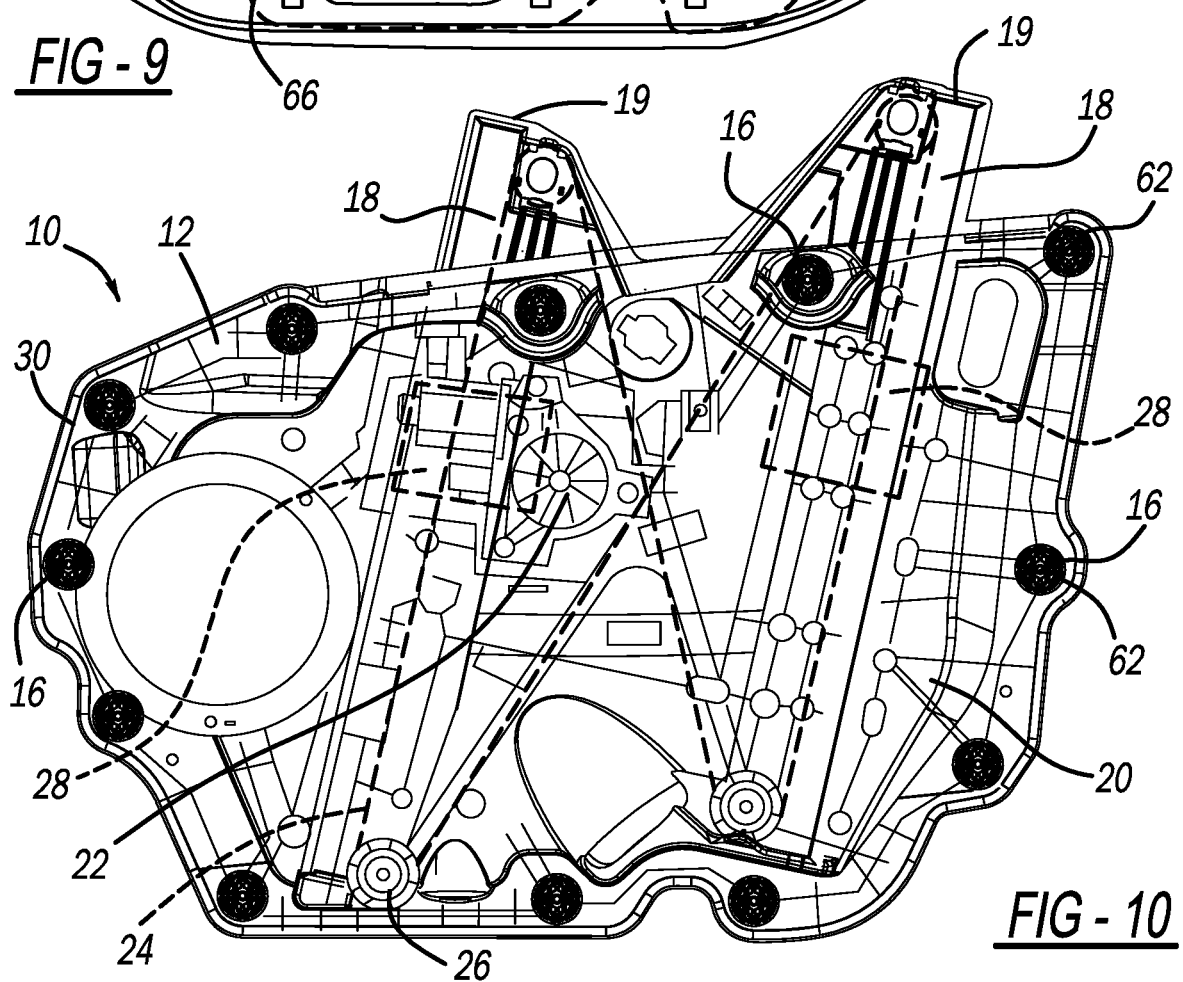
FIG. 10 shows a dry-side view of the door module of FIGS. 1 and 2 with added functional parts.
Figure 11:
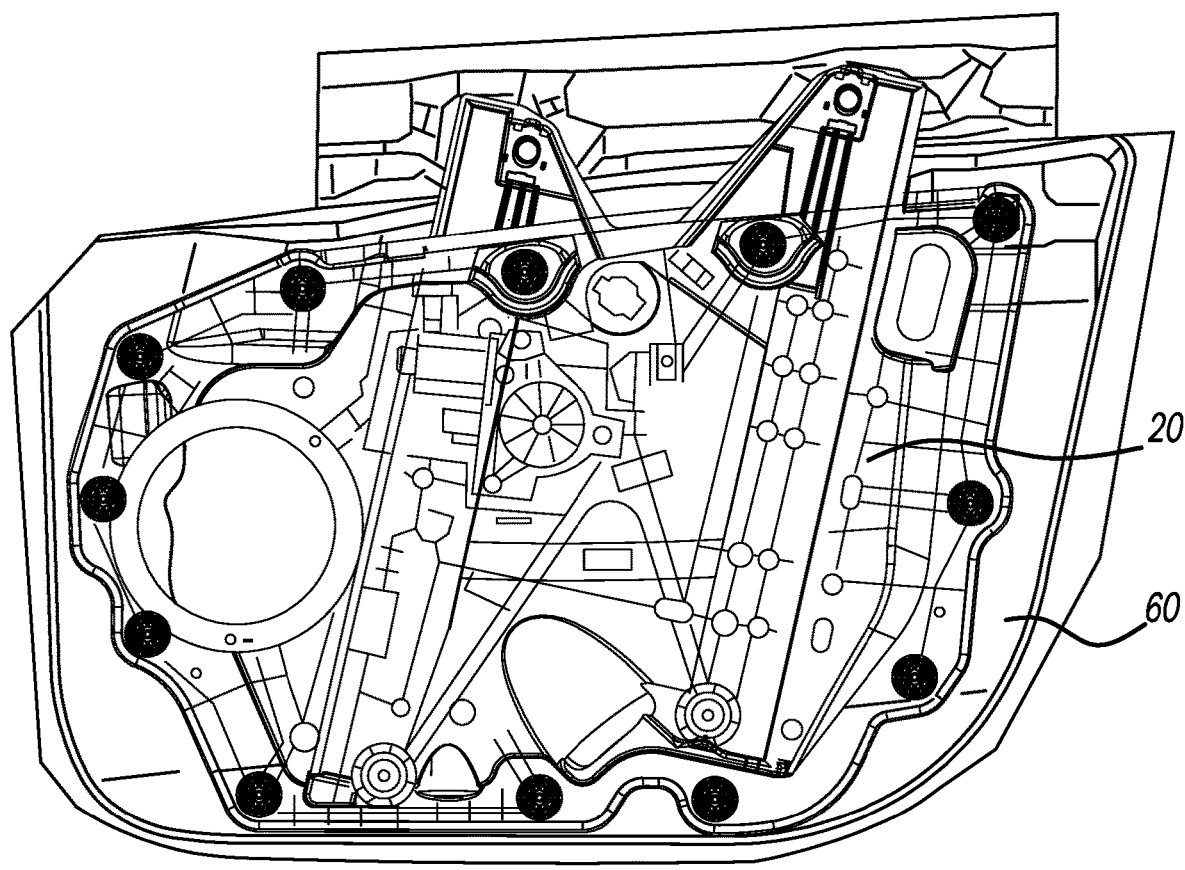
FIG. 11 shows a dry-side view of the door module of FIG. 10 mounted on the door panel of FIG. 9.

FIGS. 9, 10, and 11 illustrate a door panel 60 and a door module 10 according to one embodiment of the present invention. FIG. 11 shows the door module 10 of FIG. 10 mounted on the door panel 60 of FIG. 9 via attachment clips 62.

Customarily, the door panel 60 is formed of sheet metal and is a structural part of a vehicle door frame. It includes a central hole 64 adapted to the periphery 12 of the door module 10 shown in FIG. 10. The border 66 of central hole 64 provides a panel overlap 14 with the periphery 12 of a back plate 20 of the door module 10. The panel overlap 14 serves as a flange surface. Distributed around the central hole 64 within the panel overlap 14 are attachment openings 68 that are aligned with corresponding attachment orifices 16 distributed along the periphery 12 of the back plate 20 of the door module 10.

The door module 10 of FIG. 10 has two guide rails 18 for a dual-rail window regulator co-molded with the back plate 20. The guide rails 18 are formed on the side of the back plate 20 that faces the door panel 60 in an installed position. Installed in an vehicle, the guide rails 18 are disposed on the vehicle-outer side of the back plate 20, also called the wet side. In the shown example, the guide rails have upper ends 19 that protrude beyond the perimeter 30 of the back plate. Further functional parts affixed to the back plate 20 are an electric drive motor 22, a window regulator drive cable 24 driven by the electric drive motor 22, cable deflectors 26 in the form of pulleys, and a respective carrier plate 28 slidingly mounted on each of the guide rails 18 and connected to the drive cable 24. The guide rails 18 of the door module 10 of FIG. 10 extend laterally beyond the perimeter 30 of the back plate 20 in a direction that is an upward direction when installed in a vehicle. Sealing material 32 is provided along the entire perimeter 30 of the back plate 20 on the wet side of the back plate 20 to provide a water-resistant seal between the back plate 20 and the door panel 60 after installation.

For mounting the back plate 20 on the door panel 60, first the protruding ends 19 of the guide rails 18 are passed through the central hole 64 of the door panel 60. Then the back plate 20 is aligned with the central hole so that the attachment openings 68 of the door panel 60 and the attachment orifices 16 of the back plate 20 are aligned in pairs, where the back plate 20 is on the dry side of the door panel 60 and the guide rails 18 are on the wet side. Accordingly along the top of the back plate 20, the door panel 60 extends between the back plate 20 and the guide rails 18.

During assembly, as shown in FIG. 11, attachment clips 62 are inserted through the attachment orifices 16 and through the attachment openings 68 and fastened to press the periphery 12 of the back plate 20 against the door panel 60, by a releasable snap fit or another releasable connection.

Figure 1:
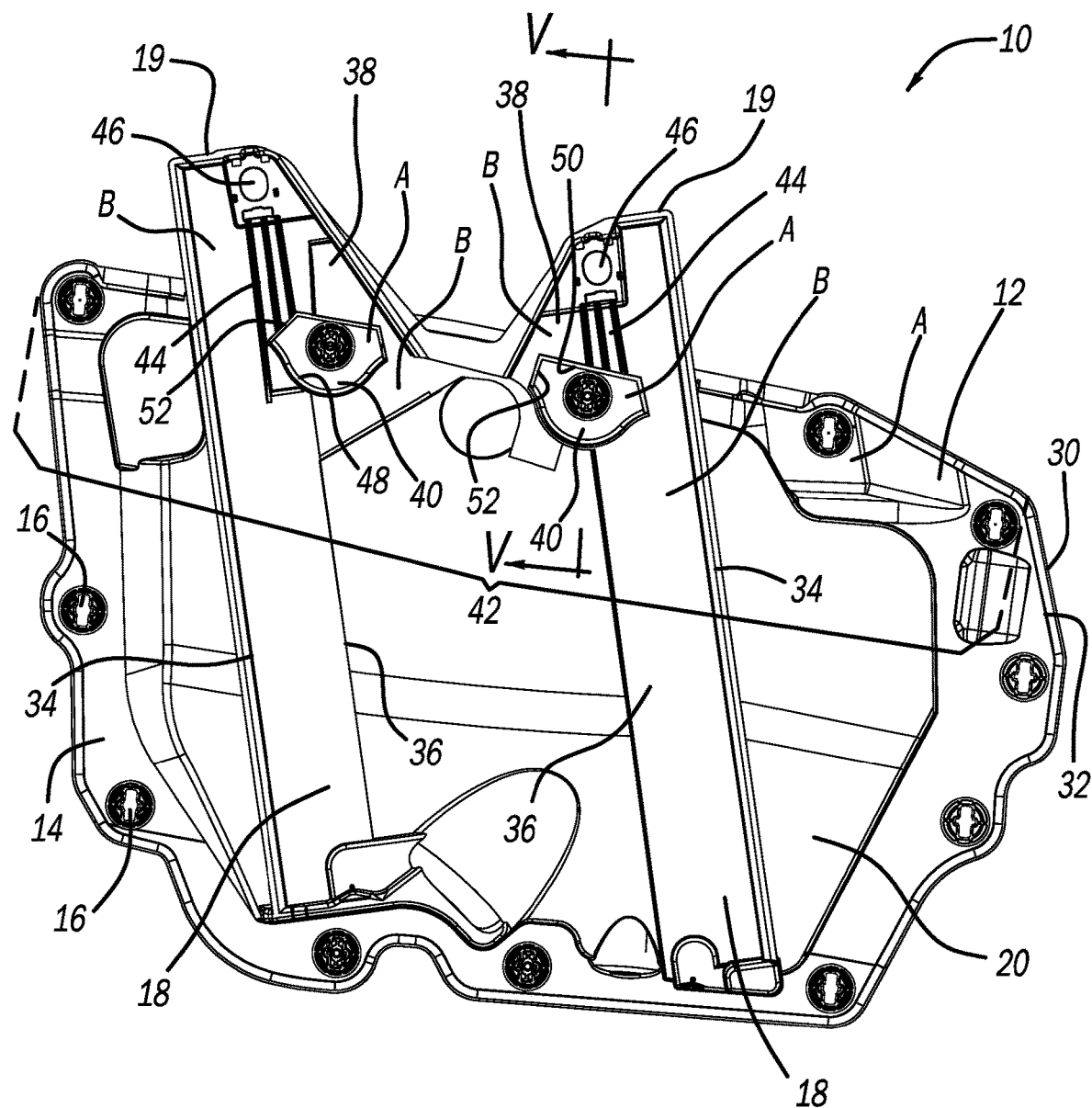
FIG. 1 shows a dual-rail door module according to a first aspect of the present invention in a view from the vehicle-outer side or wet side.
Figure 2:
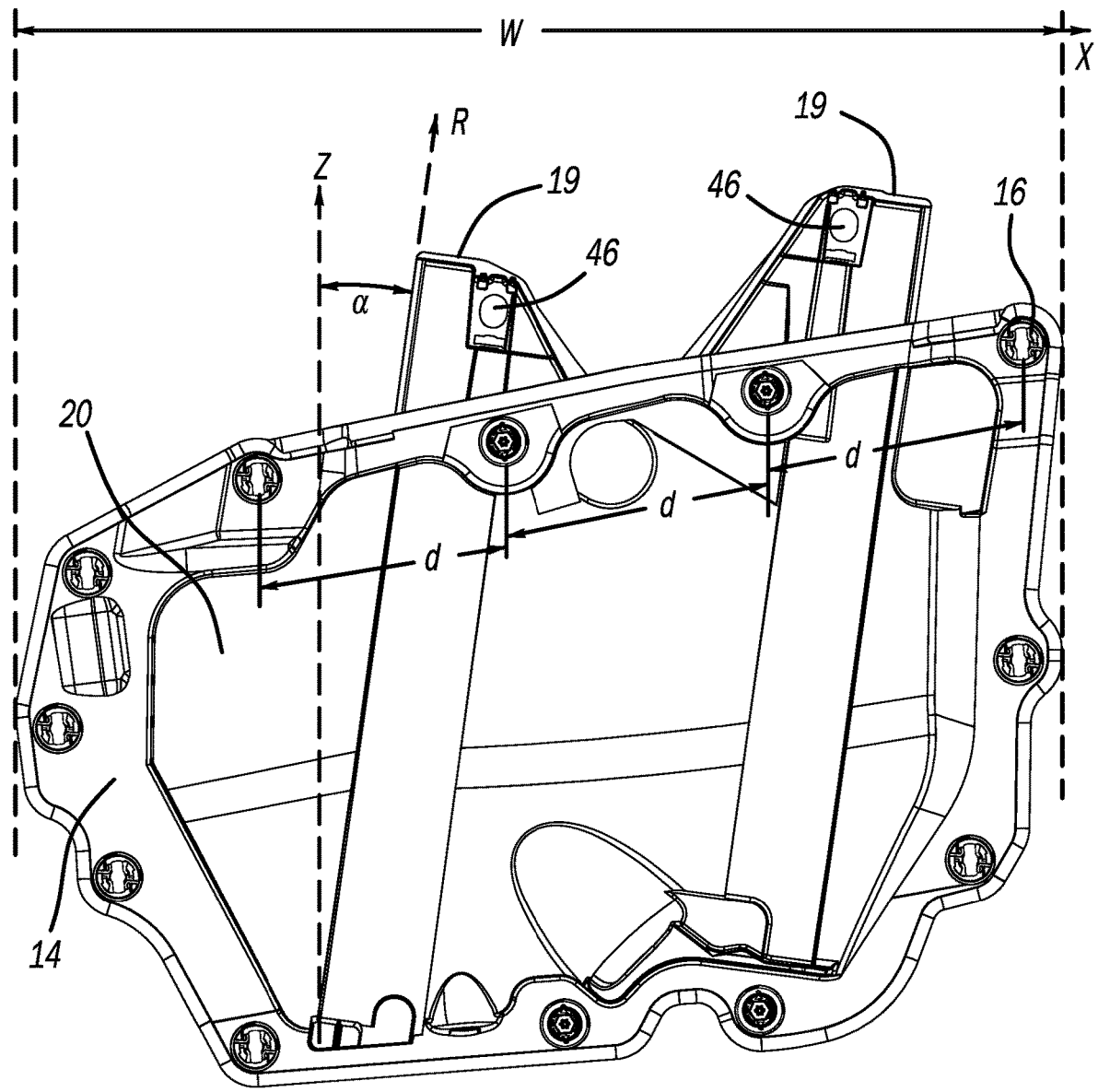
FIG. 2 show shows the door module of FIG. 1 in a view from the vehicle-inner side or dry side.
Figure 3:
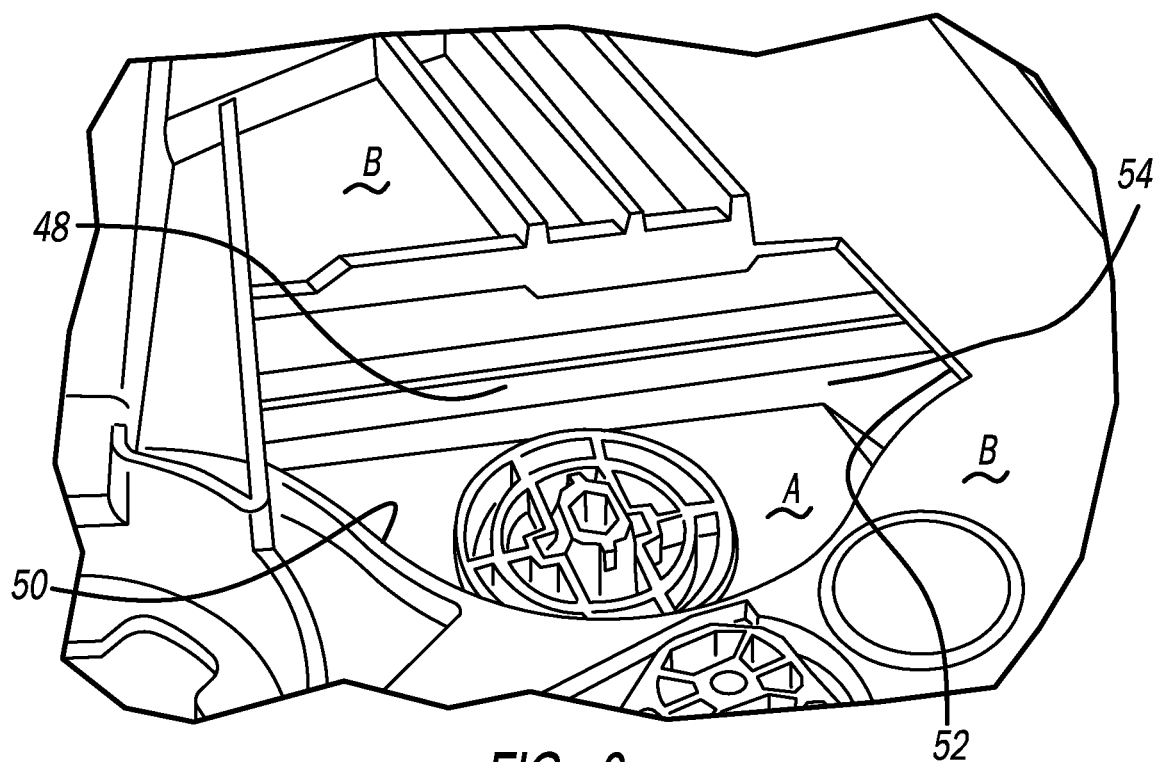
FIGS. 3 and 4 show perspective detail views of the door module of FIGS. 1 and 2.
Figure 4:
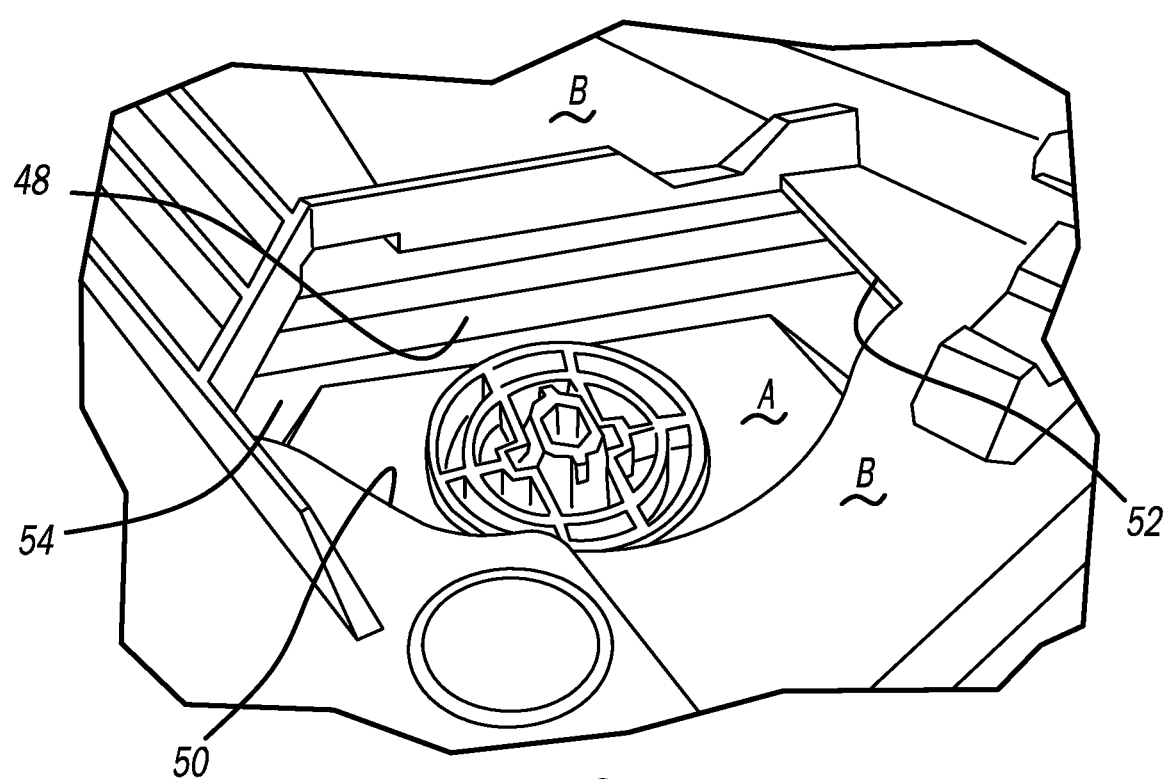

FIGS. 1 and 2 show the door module 10 of FIG. 10 in greater detail, formed by the back plate 20 with integrally co-molded guide rails 18. FIGS. 1 and 2 omit the additionally affixed functional parts, such as drive motor 22, drive cable 24, carrier plates 28, and pulleys 26. FIG. 1 shows the wet side of the door module 10, and FIG. 2 shows the dry side.

The back plate 20 has a generally planar periphery 12 that defines a base plane A. The remainder of the back plate 20 may also be generally planar or have a molded shape adapted to functional elements disposed inside the vehicle door. The two guide rails 18 extend parallel to each other in a rail direction R that forms an acute angle with a vertical direction Z when installed in a vehicle. Each of the two guide rails 18 has an upper end 19 that laterally protrudes beyond the perimeter 30 of the back plate 20.

Each of the guide rails 18 has two lateral edges extending in the guide rail 18 direction R. One of the lateral edges is a free lateral edge 34 forming a guide edge for one of the carrier plates 28 that carry the window pane. The other lateral edge is connected to the back plate 20 via a web extending along the lateral edge. Accordingly, the guide rails 18 extend in a rail plane B offset from, but generally parallel to the base plane A. Near the upper ends 19 of the guide rails 18, each of the guide rails 18 has an additional wing portion 38 extending from the side of the connected lateral edge 36 in the rail plane B away from the guide rail 18 toward the respective other guide rail 18 for keeping the drive cable 24 away from the door panel 60 in the installed position.

As defined in this application, the rail plane B does not need to extend in a single plane. The rail plane B may be composed of structures elevated from the base plane at different levels. The rail plane B, however, does not coincide anywhere with the base plane A, and the entire rail plane B is offset from the base plane A toward the vehicle-outer side of the base plane A.

If, as customary, an attachment hole were only placed between the guide rails 18 in an area outside the guide rails 18, the attachment holes along the upper periphery 42 of the back plate 20 would have a fairly large distance between them. This large distance would pose a challenge for achieving proper structural support of the back plate 20 by the door panel 60 and would also make a proper seal along the upper perimeter 30 difficult.

The door module 10 of FIGS. 1 and 2 provides a solution to this challenge by providing attachment orifices 16 in close proximity with the guide rails 18. As shown, one of the attachment orifices 16 even intersects with a trajectory of the connected lateral edge 36 of the guide rail 18. As mentioned above, portions of the two guide rails 18 obstruct the periphery 12 of the back plate 20 so that the areas covered by the guide rails 18 would typically not be accessible for placing attachment holes. These locations would produce a die-lock problem in an injection mold for forming a monolithic structure that includes both the back plate 20 and the guide rails 18.

The door module 10 of the present invention resolves this issue by providing a void 40 in the structure extending in the rail plane B. This void 40 provides access to the base plane A in an area that coincides with the panel overlap 14 along the periphery 12 of the back plate 20, where the back plate 20 overlaps with the door panel 60 as shown in FIG. 11. Accordingly, the void 40 is in a position where an attachment orifice 16 can provide a connection between the back plate 20 and the door panel 60. In the shown example of a dual-rail window regulator, each of the two guide rails 18 includes such a void 40. The void 40 cuts into the length of the respective connected lateral edge 36 of each of the guide rails 18. In other words, the connected lateral edge 36 of each of the guide rails 18 terminates at or short of the panel overlap 14 of the periphery 12 of the back plate 20, and the void 40 intersects with an upward trajectory of the connected lateral edge 36. The wing portion 38 forms a top edge 50 of the void 40.

This allows the distance d between attachment orifices 16 to be smaller than previously possible for unitarily co-molded door modules 10, where the back plate 20 and the guide rails 18 are simultaneously formed. Also, it is possible to place nearly equidistant attachment orifices 16 along the upper periphery 42 of the back plate 20 viewed in the installed position. Nearly equidistant in this context includes a deviation of up to 20% among the distances d between adjacent attachment orifices 16 along the upper periphery 42. As the number of attachment orifices 16 can be increased compared to known dual-rail arrangements, the distance d between adjacent attachment orifices 16 along the upper periphery 42 does not exceed 30% of the horizontal width of the back plate 20 in the installed position for the dual-rail door module 10 of FIGS. 1-7 and 9-11. As used here, the upper periphery 42 is defined as the portion of the periphery 12 where the perimeter 30 encloses an angle smaller than 45° with the horizontal direction X in the installed position shown in FIGS. 1, 2, and 8-11.

The void 40 is surrounded by elevated structure that extends in the rail plane B. This is shown in more detail in FIGS. 3 and 4. Reinforcing ribs 44 are provided between the void 40 and the upper end 19 of the guide rails 18 along the wing portions 38 to a location 46 where a cable deflector 26, e.g. in the form of a pulley, for the drive cable 24 is to be mounted near the upper ends 19 of the guide rails 18. The ribs 44 provide additional structural support against deformation under the pulling force of the drive cable 24.

Figure 5:
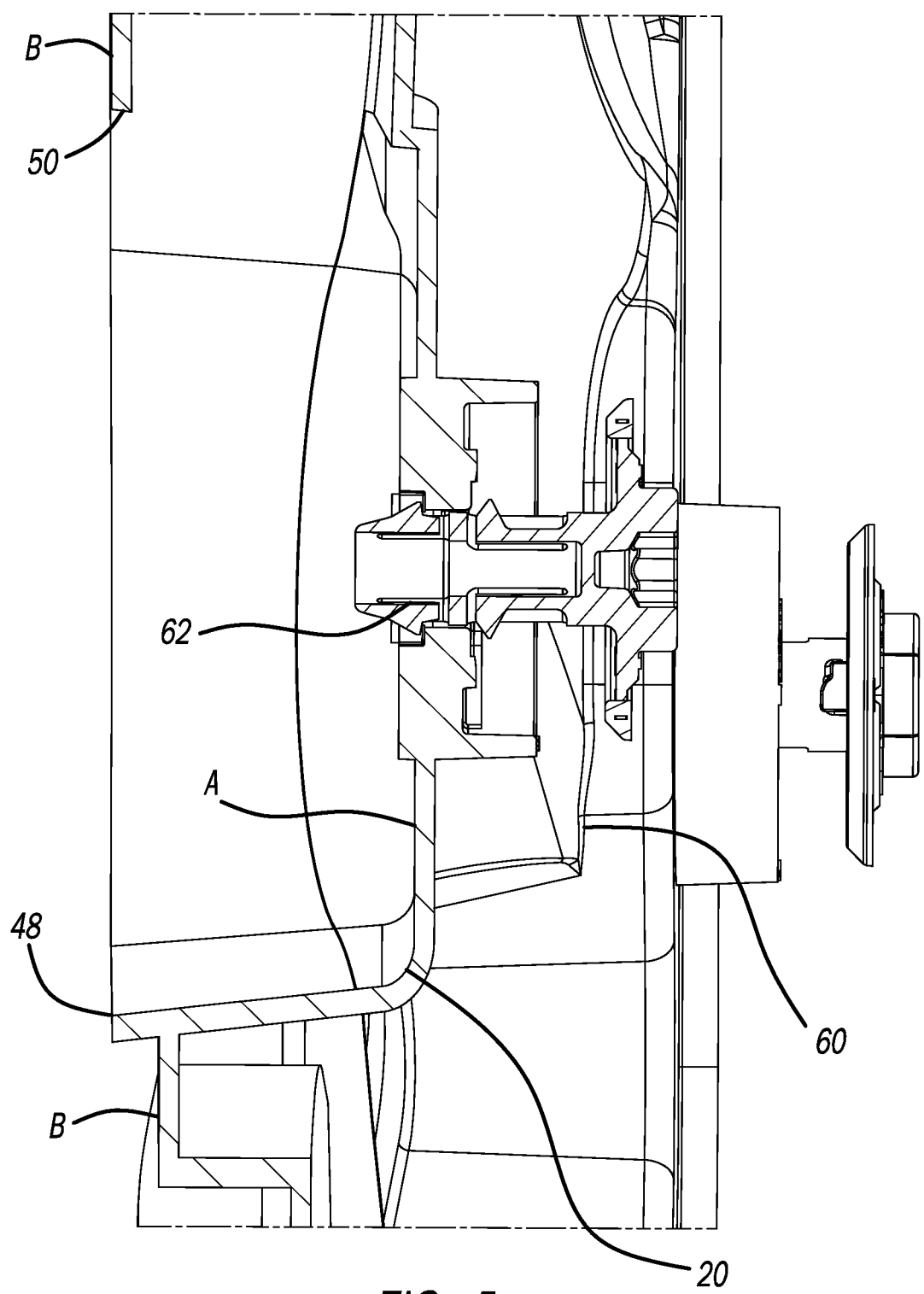
FIG. 5 shows a partial cross-sectional view marked in FIG. 1 as V-V.

As evident from FIG. 5, a cross-sectional view along the line V-V indicated in FIG. 1, the void 40 has a bottom edge 48 (if viewed in the installed position) with a wall connecting the base plane A with the rail plane B. In contrast, at least a top edge 50 and a portion of a side edge 52 of the void 40 do not have a wall. This leaves an open slot 54 54 between the rail plane B and the base plane A that allows the border 66 of the door panel 60 to be placed between the back plate 20 and the guide rails 18 rails to cover the panel overlap 14 that is used for attaching the back plate 20 to the door panel 60, at least in the location of the void 40 where the attachment orifice 16 is placed.

The corresponding door panel 60 of the shown example is shaped to have matching tongues 70 (as shown in FIG. 9) projecting into the central hole 64 and configured to extend laterally into the voids 40 when in the installed position shown in FIG. 11, where the top ends 19 of the guide rails 18 are hidden behind the door panel 60. Each of the tongues 70 has an attachment opening 68 aligned with one of the attachment orifices 16 of the voids 40.

Figure 6:
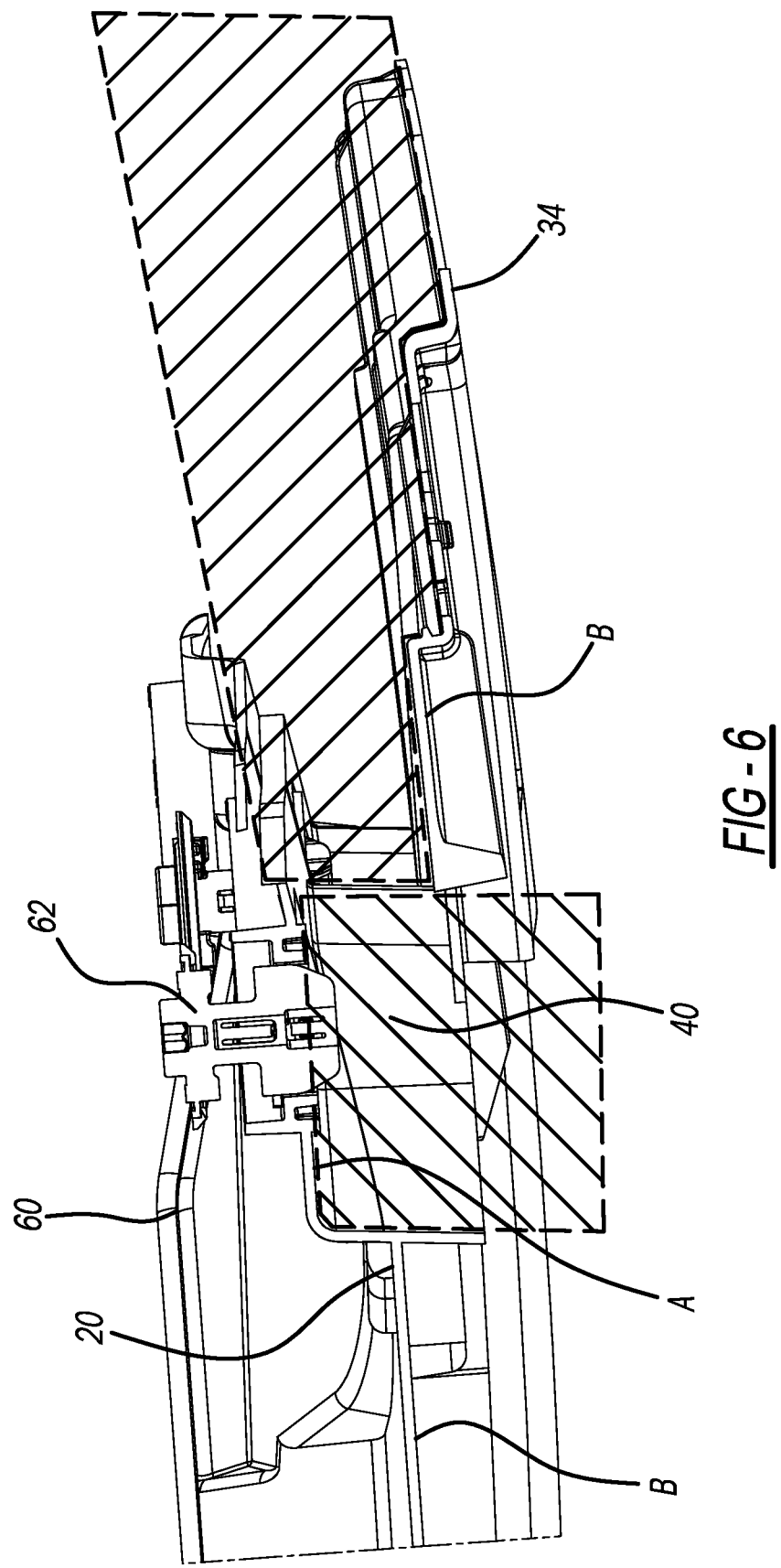
FIG. 6 shows another partial cross-sectional view marked in FIG. 1 as VI-VI.
Figure 7:
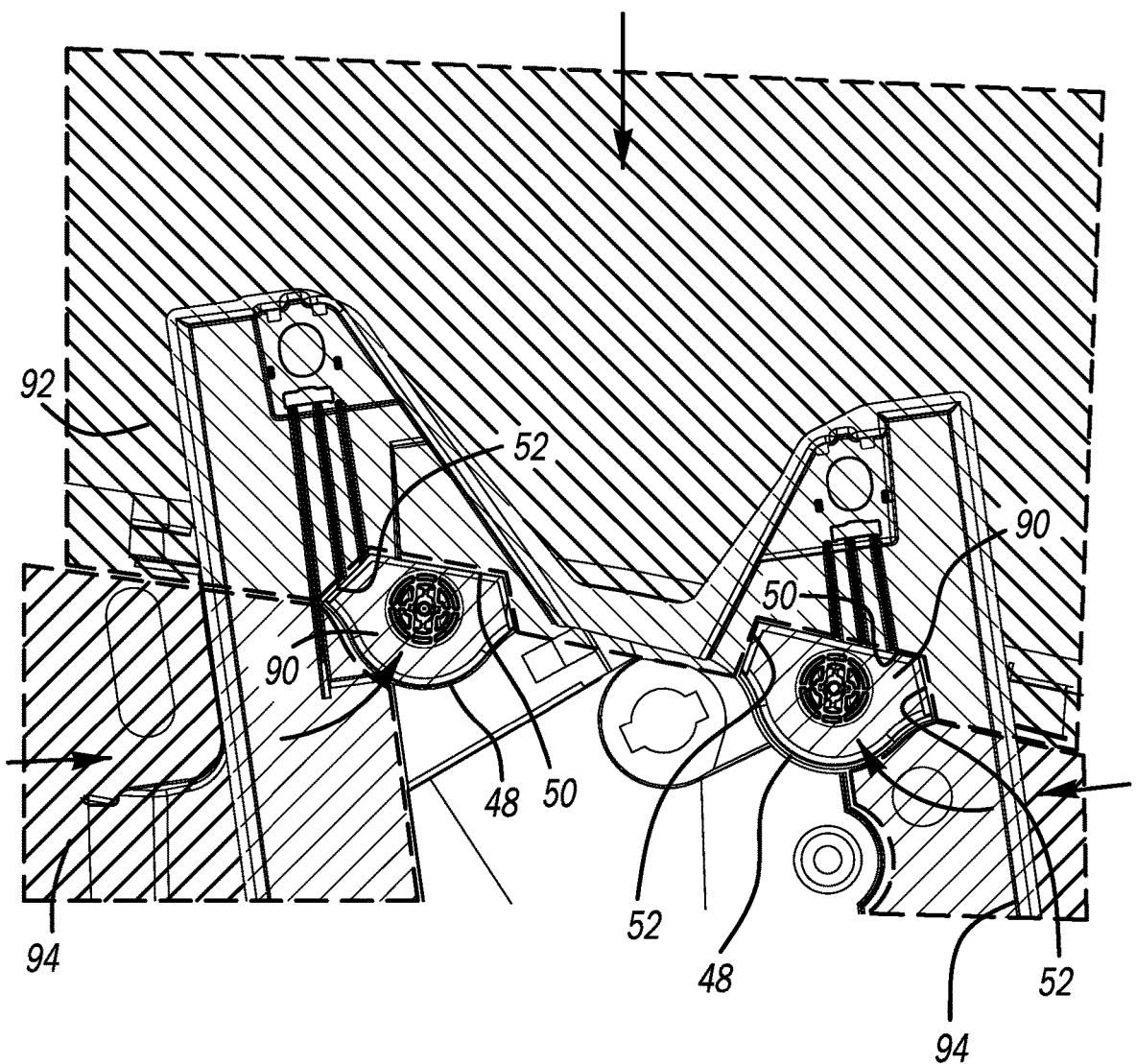
FIG. 7 schematically illustrates dies and slide tools suitable for unitarily producing the back plate and guide rails of the door module of FIGS. 1 and 2 in a single injection-molding process.

FIGS. 6 and 7 schematically illustrate how dies and slide tools are positioned during the molding process to avoid a die-lock situation. FIG. 6 is a cross-sectional view along the line VI-VI indicated in FIG. 1. A die tool 90 is placed in each void 40 from the wet side of the back plate 20 to keep the void 40 free from material. Simultaneously, a vertical slide tool 92 is inserted from the top downward, between the rail plane B and the base plane A to keep the space between the back plate 20 on the one hand and the guide rails 18 and wing portions 38 on the other hand free of material. The die tool 90 and the vertical slide tool 92 are in contact with each other at the top edge 50 of the void 40 to create the slot 54.

Two horizontal slide tools 94 separate the free lateral edges 34 of the guide rails 18 from the back plate 20. The two horizontal slide tools 94 are in contact with the vertical slide tool 92s to form the continuous free lateral edge 34 of the guide rails 18. The horizontal slide tools 94, however, are not in contact with the die tools 90 and leave a gap for forming the wall at the bottom edge 48 of the void 40. Not shown is the overall mold for the door module 10 that shapes the outer surfaces of the monolithic door module 10 including the back plate 20 and the guide rails 18.

Figure 8:
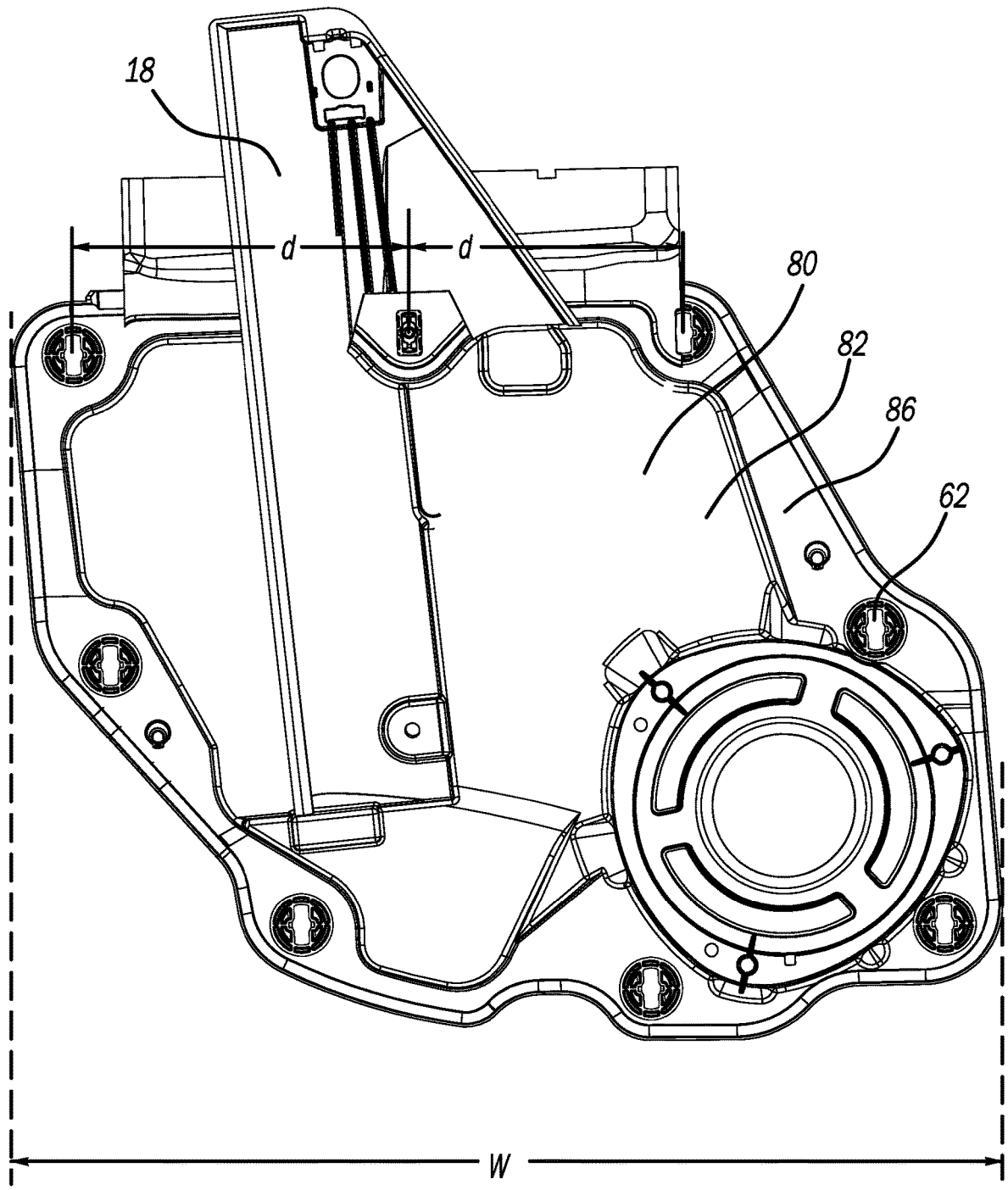
FIG. 8 shows single-rail door module mounted on a door panel according to a further aspect of the present invention, viewed from the vehicle-outer side or wet side.

FIG. 8 shows an alternative embodiment of the present invention for a single-rail window regulator. Single-rail window regulators are customary for the rear doors of sedans, where the rear-wheel well restricts the space available for the window regulator. The manufacturing concept described for the dual-rail door module 10 of the preceding drawing figures is also applicable to the single-rail the door module 80 of FIG. 8. In analogy to the foregoing description, the manufacturing process merely omits one of the two horizontal slide tools 94 for the second guide rail 18 and one die tool 90 for the second void 40. Due to the smaller size of the back plate 82, a smaller number of attachment orifices 16, three in this example, is arranged along the upper periphery 42 of the back plate 82. Accordingly, the distance d between adjacent attachment orifices 16 along the upper periphery 84 of the back plate 82 is between 25% and 40% of the width w of the back plate 82. But the orifices 16 can be more evenly distributed along the upper periphery 84 than with previously known arrangements, with a deviation between the distances d of at most 25%. The door module 80 is shown mounted on a door panel 86 and is shown from the vehicle-outer side or wet side of the door panel 86.

While the above description constitutes the preferred embodiments of the present invention, it will be appreciated that the invention is susceptible to modification, variation and change without departing from the proper scope and fair meaning of the accompanying claims.

The invention claimed is:

1. A door module comprising:
a back plate for carrying functional components of a window regulator, the back plate having a periphery with attachment orifices defining a base plane, and
at least one guide rail extending in a rail direction in a rail plane offset from the base plane, the at least one guide rail having a connected edge and a free edge, both the connected edge and the free edge extending in the rail direction, the connected edge being attached to the back plate and the free edge being shaped for slidably attaching a carrier plate for a window, the at least one guide rail having an upper end vertically protruding beyond the periphery of the back plate in an installed position;
wherein a void in the rail plane intersects a trajectory of the connected edge of at least one of the at least one guide rail, the void providing access through the rail plane to the periphery of the base plane, wherein one of the attachment orifices is disposed in the void.

2. The door module according to claim 1, wherein the at least one guide rail is two guide rails and each of the guide rails is associated with a respective void intersecting the trajectory of the connected edge of the guide rail.

3. The door module according to claim 1, wherein the void has a bottom wall connecting the rail plane with the base plane and an open upper edge forming a slot between the base plane and the rail plane.

4. The door module according to claim 1, further comprising at least one lateral wing portion extending in the rail plane at the upper end of the at least one rail from a side of the connected edge, wherein the wing portion forms an upper edge of the void.

5. The door module according to claim 4, further comprising reinforcement on the wing portions between the void and a fastening structure for a cable deflector.

6. The door module according to claim 1, wherein the back plate and the at least one guide rail are unitarily co-molded.

7. The door module according to claim 1, wherein the back plate has an upper periphery portion, in which the attachment orifices are spaced apart with distances between two adjacent attachment orifices along the upper periphery portion, wherein the distances deviate from one another by no more than 25%.

8. The door module according to claim 1, wherein the back plate has an upper periphery portion, in which the attachment orifices are spaced apart with distances between two adjacent attachment orifices along the upper periphery portion, wherein each of the distances amounts to at most 30% of a horizontal width of the back plate in the installed position.

9. A vehicle door assembly comprising:
a door module having
- a back plate for carrying functional components of a window regulator, the back plate having a periphery with attachment orifices defining a base plane, and
- at least one guide rail extending in a rail direction in a rail plane offset from the base plane, the at least one guide rail having a connected edge and a free edge, both the connected edge and the free edge extending in the rail direction, the connected edge being attached to the back plate and the free edge being shaped for slidably attaching a carrier plate for a window, the at least one guide rail having an upper end vertically protruding beyond the periphery of the back plate in an installed position;
- wherein a void in the rail plane intersects a trajectory of the connected edge of at least one of the at least one guide rail, the void providing access through the rail plane to the periphery of the back plate, wherein one of the attachment orifices is disposed in the void; and
- a door panel having a central hole with a periphery overlapping with the periphery of the back plate, the periphery of the door panel having respective attachment openings aligned with the attachment orifices of the back plate of the door module.

10. The vehicle door assembly of claim 9, wherein the door panel comprises at least one tongue projecting into the void.

11. The vehicle door assembly of claim 10, wherein the at least one tongue comprises an attachment opening aligned with the attachment orifice of the void.

12. The vehicle door assembly of claim 9, wherein the perimeter of the back plate is sealingly attached to a vehicle-inner side of the door panel.

13. The vehicle door assembly of claim 9, wherein the base plane extends a vehicle-inner side of the door panel and the rail plane extends on a vehicle-outer side of the door panel.

* * * * *